US008941561B1

(12) United States Patent
Starner

(10) Patent No.: US 8,941,561 B1
(45) Date of Patent: Jan. 27, 2015

(54) IMAGE CAPTURE

(71) Applicant: Thad Eugene Starner, Mountain View, CA (US)

(72) Inventor: Thad Eugene Starner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/631,438

(22) Filed: Sep. 28, 2012

Related U.S. Application Data

(60) Provisional application No. 61/584,138, filed on Jan. 6, 2012.

(51) Int. Cl.
*G09G 5/00* (2006.01)

(52) U.S. Cl.
USPC ........................................ 345/8; 345/7; 345/9

(58) Field of Classification Search
CPC ......... G06F 3/013; G06F 3/011; G06F 3/012; G06F 3/0304; G02B 27/017; G02B 2027/0138; G02B 27/0093; G02B 27/01; G02B 2027/0118; G02B 2027/0187; G02B 2027/0132; G02B 27/0101; G02B 27/0172; G02B 27/0176; G06T 19/006; G09G 3/003; H04N 13/0497; H04N 13/0285; H04N 13/044; H04N 13/0059
USPC ...................................................... 345/7, 8, 9
See application file for complete search history.

(56) References Cited

U.S. PATENT DOCUMENTS

| 5,347,371 | A | 9/1994 | Nishimura et al. |
|---|---|---|---|
| 5,572,343 | A | 11/1996 | Okamura et al. |
| 7,091,928 | B2 | 8/2006 | Rajasingham |
| 7,248,294 | B2 | 7/2007 | Slatter |
| 7,391,907 | B1 | 6/2008 | Venetianer et al. |
| 7,401,920 | B1 * | 7/2008 | Kranz et al. ................. 351/210 |
| 7,447,330 | B2 | 11/2008 | Yamasaki |
| 7,584,158 | B2 | 9/2009 | Iwaki et al. |
| 7,633,527 | B2 | 12/2009 | Pilu |

(Continued)

FOREIGN PATENT DOCUMENTS

WO    2011062591 A1    5/2011

OTHER PUBLICATIONS

Asai, Visualization Based on Geographic Information in Augmented Reality, Augmented Reality, ISBN 978-953-7619-69-5, pp. 230-, downloaded from SCIYO.com, Jan. 2010.

(Continued)

*Primary Examiner* — Joe H Cheng
*Assistant Examiner* — Michael J Jansen, II
(74) *Attorney, Agent, or Firm* — McDonnell Boehnen Hulbert & Berghoff LLP

(57) ABSTRACT

Methods and systems for capturing and storing an image are provided. In one example, eye-movement data associated with a head-mountable device (HMD) may be received. The HMD may include an image-capture device arranged to capture image data corresponding to a wearer-view associated with the HMD. In one case, the received eye-movement data may indicate sustained gaze. In this case, a location of the sustained gaze may be determined, and an image including a view of the location of the sustained gaze may be captured. At least one indication of a context of the captured image, such as time and/or geographic location of the HMD when the image was captured may be determined and stored in a data-item attribute database as part of a record of the captured image. In a further example, movements associated with the HMD may also be determined and based on to determine sustained gaze and the location of the sustained gaze.

14 Claims, 10 Drawing Sheets

(56) References Cited

U.S. PATENT DOCUMENTS

| | | |
|---|---|---|
| 7,733,369 B2 | 6/2010 | Yin et al. |
| 7,742,077 B2 | 6/2010 | Sablak et al. |
| 7,884,849 B2 | 2/2011 | Yin et al. |
| 7,940,299 B2 | 5/2011 | Geng |
| 8,026,945 B2 | 9/2011 | Garoutte et al. |
| 2002/0140822 A1 | 10/2002 | Kahn et al. |
| 2003/0179288 A1 | 9/2003 | Jones |
| 2004/0061831 A1* | 4/2004 | Aughey et al. ............... 351/209 |
| 2004/0100567 A1* | 5/2004 | Miller et al. ................ 348/239 |
| 2004/0101178 A1* | 5/2004 | Fedorovskaya et al. ...... 382/128 |
| 2004/0103111 A1* | 5/2004 | Miller et al. ................ 707/102 |
| 2005/0035925 A1* | 2/2005 | Ostromek et al. ............... 345/8 |
| 2005/0063566 A1 | 3/2005 | Beek et al. |
| 2005/0212817 A1* | 9/2005 | Cannon et al. ............... 345/619 |
| 2005/0231599 A1* | 10/2005 | Yamasaki ............... 348/207.99 |
| 2006/0187305 A1 | 8/2006 | Trivedi et al. |
| 2007/0146484 A1 | 6/2007 | Horton et al. |
| 2007/0270215 A1 | 11/2007 | Miyamoto et al. |
| 2008/0036875 A1 | 2/2008 | Jones et al. |
| 2008/0129844 A1 | 6/2008 | Cusack et al. |
| 2008/0192116 A1 | 8/2008 | Tamir et al. |
| 2008/0292140 A1 | 11/2008 | Morris et al. |
| 2009/0087029 A1 | 4/2009 | Coleman et al. |
| 2009/0097710 A1 | 4/2009 | Sroka et al. |
| 2009/0219387 A1 | 9/2009 | Marman et al. |
| 2009/0259102 A1 | 10/2009 | Koninckx et al. |
| 2009/0324010 A1 | 12/2009 | Hou |
| 2010/0159985 A1* | 6/2010 | Ladouceur ................ 455/556.1 |
| 2010/0194859 A1 | 8/2010 | Heigl |
| 2011/0018903 A1* | 1/2011 | Lapstun et al. ............... 345/633 |
| 2011/0057863 A1 | 3/2011 | Sugihara et al. |
| 2011/0149072 A1 | 6/2011 | McCormack |
| 2011/0170067 A1* | 7/2011 | Sato et al. .................... 351/209 |
| 2011/0213664 A1 | 9/2011 | Osterhout et al. |
| 2011/0263946 A1 | 10/2011 | El Kaliouby et al. |
| 2011/0270522 A1* | 11/2011 | Fink .............................. 701/208 |
| 2011/0310260 A1 | 12/2011 | Jordan et al. |
| 2012/0019522 A1 | 1/2012 | Lawrence et al. |
| 2012/0019645 A1* | 1/2012 | Maltz .............................. 348/78 |
| 2012/0075168 A1* | 3/2012 | Osterhout et al. ................ 345/8 |
| 2012/0206452 A1* | 8/2012 | Geisner et al. ............... 345/419 |
| 2013/0002813 A1* | 1/2013 | Vaught et al. .................. 348/43 |
| 2013/0036134 A1* | 2/2013 | Neven et al. .................. 707/769 |
| 2013/0050070 A1* | 2/2013 | Lewis et al. .................. 345/156 |
| 2013/0054622 A1* | 2/2013 | Karmarkar et al. ........... 707/749 |
| 2013/0222638 A1* | 8/2013 | Wheeler et al. ............ 348/231.2 |
| 2013/0258089 A1* | 10/2013 | Lyons et al. .................... 348/77 |

OTHER PUBLICATIONS

Miura et al., An Active Vision System for Real-Time Traffic Sign Recognition, Proc. 2000 IEEE.

Tack et al., Soldier Information Requirements Technology Demonstration 9SIREQ-TD) Off-Bore Camera Display Characterization Study, Human Systems Incorporated, DRDC-Toronto CR-2005-025, May 2005.

Takacs et al., Feature Tracking for Mobile Augmented Reality Using Video Coder Motion Vectors, 2007 IEEE.

* cited by examiner

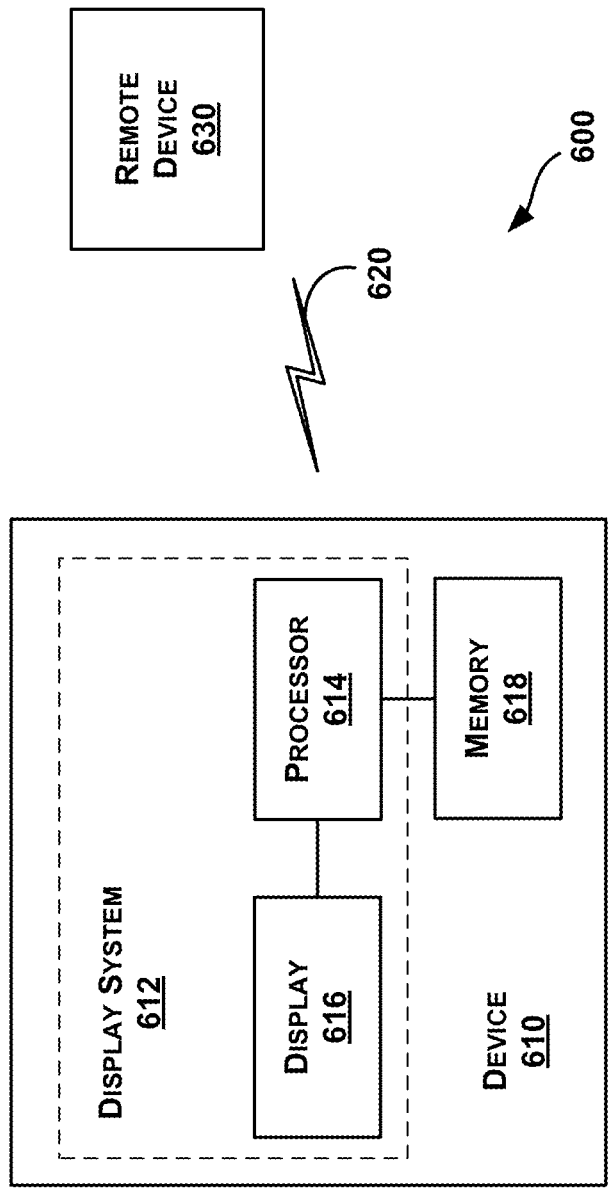

IMAGE CAPTURE

CROSS-REFERENCE TO RELATED APPLICATION

The present application claims priority to U.S. Provisional Application Ser. No. 61/584,138, filed on Jan. 6, 2012, the entire contents of which are incorporated by reference.

BACKGROUND

Unless otherwise indicated herein, the materials described in this section are not prior art to the claims in this application and are not admitted to be prior art by inclusion in this section.

Wearable systems can integrate various elements, such as miniaturized computers, cameras, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems as well as miniaturized electronic components and optical elements, it has become possible to consider wearable compact cameras for capturing the wearer's experiences of the real world.

By orienting the wearable camera towards the same general direction as the wearer's point of view, media representing a real world experience of the user can be captured. The captured media may include video, audio, and still frame images. In some cases, the media may be captured continuously. In other cases, the media may be captured based on inputs from the wearer.

SUMMARY

In a first aspect, a method is provided. The method includes receiving eye-movement data associated with a head-mountable device (HMD). The HMD may include an image-capture device arranged to capture image data that corresponds to a wearer-view associated with the HMD. The method further determining that the eye-movement data corresponds to sustained gaze and responsively determining a location of the sustained gaze in the wearer-view, causing the image-capture device to capture an image that includes a view of the location of the sustained gaze, determining at least one indication of a context of the captured image, and causing a record for the captured image to be stored in a data item-attribute database. The record includes the at least one indication of the context of the captured image.

In a second aspect, a head-mountable device (HMD) is provided. The HMD includes an image-capture device arranged to capture image data corresponding to a wearer-view associated with the HMD, an eye-tracking system configured to acquire eye-movement data, and a controller. The controller is configured to receive the eye-movement data, determine that the eye-movement data corresponds to sustained gaze and responsively, determine a location of the sustained gaze in the wearer-view, cause the image-capture device to capture an image that includes a view of the location of the sustained gaze, determine at least one indication of a context of the captured image, and cause a record for the captured image to be stored in a data item-attribute database. The record includes the at least one indication of the context of the captured image.

In a third aspect, a non-transitory computer readable memory with instructions stored thereon is provided. The instructions may be executable by a computing device to cause the computing device to perform functions. The functions include receiving eye-movement data associated with a head-mountable device (HMD). The HMD comprises an image-capture device arranged to capture image data that corresponds to a wearer-view that is associated with the HMD. The functions also include determining that the eye-movement data corresponds to sustained gaze and responsively determining a location of the sustained gaze in the wearer-view, causing the image-capture device to capture an image that includes a view of the location of the sustained gaze, determining at least one indication of a context of the captured image, and causing a record for the captured image to be stored in a data item-attribute database. The record includes the at least one indication of the context of the captured image.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 6 shows a simplified block diagram of an example computer network infrastructure.

DETAILED DESCRIPTION

Figure 1:
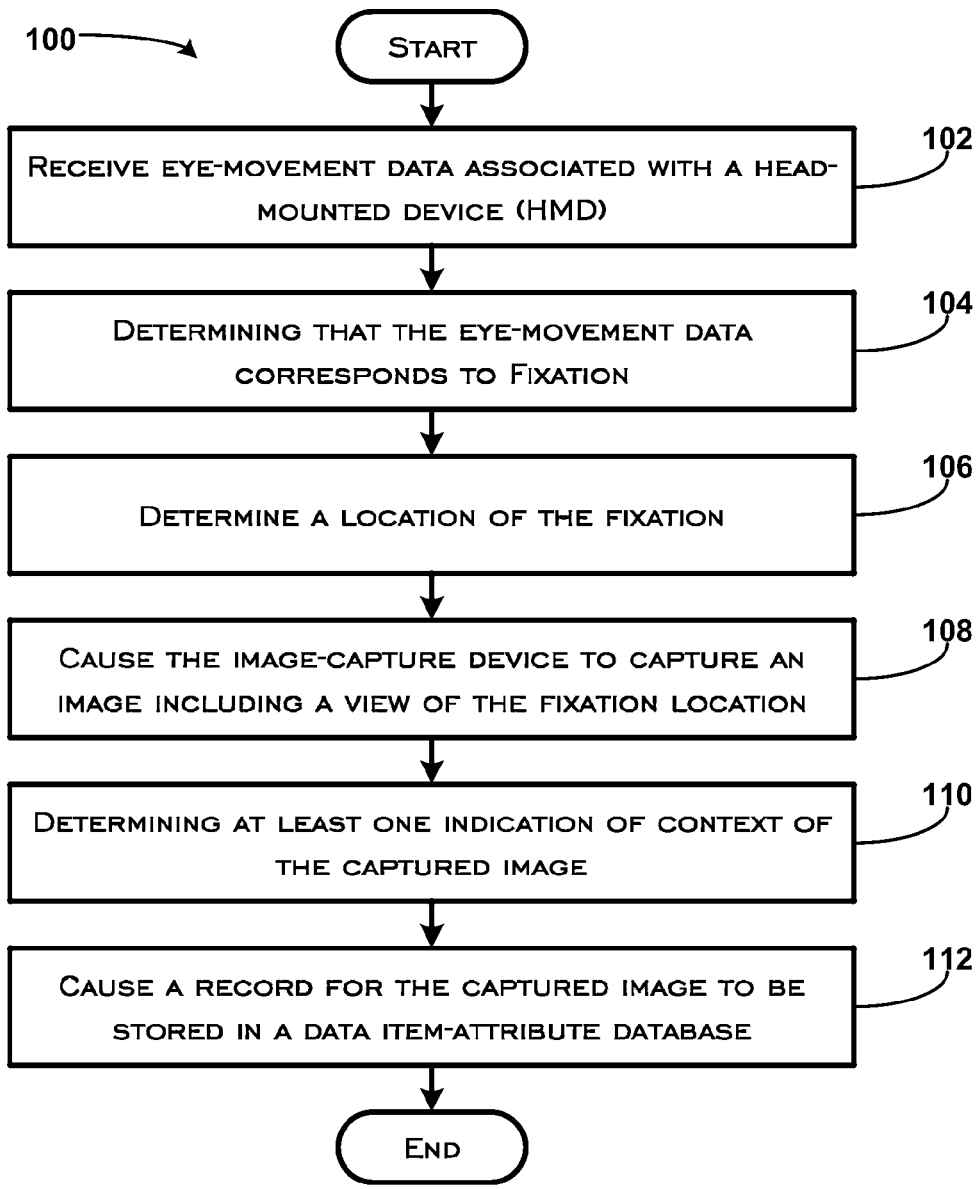
FIG. 1 is a block diagram of an example method for capturing and storing images based on gaze detection.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

In a number of scenarios, a person who is wearing a head-mountable camera may wish to capture images of something the person is looking at. Accordingly, example embodiments may be implemented on a head-mountable device (HMD) to detect when a user is staring at something in their environment, and responsively take a picture of what the person is staring at. This may allow the HMD wearer to capture images of something by staring at it, without having to reach for a camera. The wearer could use this functionality intentionally, by intentionally staring at something the wearer wants to take a picture of. This functionality may also be implemented so as to automatically take pictures of things that interest the wearer, and in the instance the wearer consents, automatically create a log of such pictures. This automatic image capture functionality may be turned on or off by the wearer. In the case this functionality is turned on and the wearer consents, the wearer may come to assume and rely on such a log to document and create a visual record of things the wearer is interested in, without any explicit input from the wearer to do so. In one instance, the captured images may be initially stored in a private album only accessible by the wearer. The wearer may then review, delete, edit, or share the captured images at the wearer's choosing.

In one example, a head-mountable device (HMD) may include a point-of-view camera that is configured to capture images from the point of view of a wearer (when the HMD is being born). The HMD may include sensors that detect staring by, e.g., analyzing the wearer's eye movement (or lack thereof). When the HMD detects the wearer is staring at something, the HMD may capture and store an image, possibly including information such as time and/or location of the image to allow for quick reference at a later time.

In a more specific example, the person wearing the HMD may be enjoying an afternoon walk around town. During the walk, the user may notice a number of things in his/her surrounding environment, such as a new local business in town or an advertisement billboard. In one case, the user may find the advertisement billboard to be particularly entertaining or informative, and may wish to capture the content of the billboard for sharing or reviewing in the future. In either case, the user may capture one or more images of the billboard by simply staring at the billboard.

In an embodiment of the aforementioned HMD, the image-capture device may be configured to capture an image from the point-of-view of the user when the eyes of the user sustain gaze on a particular item or location. Continuing with the example above, the eyes of the user may sustain gaze on the billboard when the user is staring at the billboard, and the image-capture device may then capture an image of the billboard in response to the sustained gaze of the eyes. The captured images may then be stored for the user to share or review at a later time. In one example, the HMD may be configured to store the captured image in a database containing other data items associated with the user and experiences of the user. As such, the image and information associated with the image such as time and/or location may be stored to generate or add content to a "life log" of the user.

This use of the HMD may also be applied to other scenarios for capturing other elements of the user's life experiences, whether the experiences are expected, unexpected, memorable, or merely in passing. Further discussions relating to devices and methods for capturing images representing experiences from the perspective of a user may be found below in more detail.

2. Example Method for Capturing and Storing of Images by an HMD

While examples described herein may refer specifically to the use of a head-mountable device (HMD), those skilled in the art will appreciate that any wearable computing device with an image-capture device may be configured to execute the methods described herein to achieve relevant results. While the methods may be carried out in whole or in part by a wearable computer, it should be understood that methods may be implemented in whole or in part by other types of computing devices. For example, methods may be implemented in whole or in part by a server system, which receives data from the HMD.

FIG. 1 is a block diagram of an example method 100 for capturing and storing images based on gaze detection. Method 100 may include one or more operations, functions, or actions as illustrated by one or more of blocks 102-112. Although the blocks are illustrated in a sequential order, these blocks may also be performed in parallel, and/or in a different order than those described herein. Also, the various blocks may be combined into fewer blocks, divided into additional blocks, and/or removed, depending upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive, as described later in FIGS. 4 and 5. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

At block 102, the method 100 involves receiving eye-movement data associated with an HMD. The HMD may be a system such as example systems 400 or 500 discussed below in connection to FIGS. 4A and 4B, and FIGS. 5A and 5B, respectively. In one example, the HMD may include an image-capture device arranged to capture image data corresponding to a point of view of a wearer of the HMD, which is referred to as "wearer-view" hereinafter. In one case, the image-capture device may be the video camera 420, 506, or 528 of FIG. 4A, 5A, or 5B, respectively.

In one example, the eye-movement data may be received from an eye-tracking device coupled to the HMD. The eye-tracking device may include one or more inward facing cameras for tracking the movements of at least one eye of the wearer. The tracking of eye movements may be based on pupil or glint tracking, for example. The tracked movements of the at least one eye may then be used to determine the series of gaze directions relative to the eye-tracking device on the HMD. The gaze directions may then be based on to determine the series of gaze points where the wearer may be looking. In addition to the one or more inward facing cameras for tracking movements of at least one eye of the wearer, other eye-tracking techniques using different sensors may also be implemented to obtain the gaze points.

At block 104, the method 100 involves determining that the eye-movement data corresponds to sustained gaze. In one example, sustained gaze may be determined when consecutive gaze points in a series of gaze points are substantially within one area. As such, sustained gaze may be determined when the wearer is staring at an object of interest such that eye movements of the wearer indicate that the wearer may be looking intently towards the object of interest, resulting in consecutive gaze points in the series of gaze points being substantially within the one area, where the object of interest is.

In one case, movements of the HMD may factor into determining that the eye-movement data corresponds to sustained gaze. For instance, the wearer of the HMD may be in motion while he/she is looking intently towards the object of interest. In this case, the series of gaze points may not be substantially within one area relative to the eye-tracking device on the HMD while the user may be sustaining gaze on the object of interest. As such, movement data associated with the HMD may be used to account for the relative movement of the HMD when determining that the eye-movement data corresponds to sustained gaze.

In one example, the movement data may be acquired from a motion detection system coupled to the HMD. The motion detection system may include one or more motion sensors, such as accelerometers and/or gyroscopes for detecting at least linear, radial, and axial movements and generating movement data based on the detected movements.

In one case, sustained gaze may be determined when the eye-movement data indicates a series of gaze points shifting in synchrony, but in substantially an opposite direction as the movement of the HMD, as indicated by the movement data. For instance, the wearer may be walking in a forward direction while looking at a sign at a distance to the right side of the wearer. As the wearer approaches the sign, a series of gaze points may gradually shift nearer and towards the right while the wearer is moving forward. In this case, the movement data may indicate that the wearer is walking in the forward direction such that the gradual shift of gaze points may be due to the movement while the wearer is looking intently at the sign. Accordingly, sustained gaze may be determined based on the eye-movement data and the HMD movement data.

At block 106, the method 100 involves determining a location of the sustained gaze in response to determining that the eye-movement data corresponds to a sustained gaze. In one example, the location of the sustained gaze may indicate the object of interest the user is looking intently at. In one case, the location of the sustained gaze may be determined based on the gaze points indicated by the eye-movement data relative to the HMD. In another case, the eye-movement data may further include eye focusing data indicating how the eyes of the wearer may be focused, thereby indicating at distance at which the wearer is looking intently. In this case, the distance at which the wearer is looking intently may be based on to determine the object of interest the wearer may be interested in.

At block 108, the method 100 involves causing the image-capture device to capture an image including a view of the location of the sustained gaze. Similar to video cameras 420 and 506 discussed below in connection to FIG. 4A and FIG. 5A, respectively, the image-capture device may be configured to have an imaging field of view including at least a portion of the field of view of the wearer. In other words, the image-capture device may be configured to capture images from a point of view of the wearer, and accordingly, capture an image of the object of interest wearer may be looking intently at.

In one example, causing the image-capture device to capture an image including a view of the location of the sustained gaze may further involve focusing the image-capture device on the location of the sustained gaze. As mentioned above, gaze points indicated by the eye-movement data may be based on to determine the location of the wearer's sustained gaze. In this case, the location of the wearer's sustained gaze within the field of view of the wearer may be mapped to a location within the imaging field of view of the image-capture device. The image-capture device may accordingly focus on the mapped location when capturing the image. In another example, if the eye-movement data further includes eye focusing data indicating how the eyes of the wearer may be focused, as mentioned above, the image-capture device may be configured to accordingly focus on the same object of interest as the eyes of wearer are focused on when capturing the image. In either example, a pixel location on the captured image may be identified and recorded to indicate where on the captured image the wearer was looking intently at when the image was captured.

At block 110, the method 100 involves determining at least one indication of context of the captured image. The at least one indication of context may be from a set of context attributes associated with experiences of the wearer. The set of context attributes associated with experiences of the wearer may indicate contexts of the experiences, and may include, without limitations, a location attribute and a time attribute.

In the case the at least one indication of context includes a location attribute, determining at least one indication of context of the captured image may involve acquiring a location associated with the captured image. In one example, the HMD may include a global positioning system (GPS), configured to determine a geographic location associated with the HMD. In this case, the geographic location of the HMD may be acquired from the GPS when an image is captured.

In the case the at least one indication of context includes a time attribute, determining at least one indication of context of the captured image may involve acquiring a time associated with the captured image. In one example, the time may be acquired from a system clock of the HMD. In another example, the time may be acquired from a server in communication with the HMD. In this instance, a local time may be acquired from the server based the time zone the wearer is in, according to the geographic location of the HMD acquired from the GPS. In either example, the time may be acquired when the image is captured.

As mentioned above, the set of context attributes may indicate contexts of the wearer's experiences. As such, the geographic location and time associated with the captured image may indicate a context of the captured image. For instance, if the time, date, and location associated with an image of a wrapped gift box is 9:07 am, December 25, and an address of the wearer's parents' house, respectively, then the context of the captured image, as indicated by the location and time attributes may be of opening gifts on Christmas morning.

At block 112, the method 100 involves causing a record for the captured image to be stored in a data item-attribute database. In one example, the record may include the at least one indication of context of the captured image, such as a geographic location or time for when the image was captured. Further, as mentioned previously, a pixel location on the captured image may also be included in the record to identify a location on the captured image where the wearer was looking intently when the image was captured.

In one example, the record for the captured image may be stored on a data storage medium configured to store at least image data and attributes. In one case, the data storage medium may be attached to the HMD, and may be configured to automatically store the record for the captured image when the image is captured. In another case, the storage medium may be provided on a server in communication with the HMD. In this case, storing the record of the captured image may further involve sending the record of the captured image to the server.

As indicated above, the record of the captured image may be stored in a data item-attribute database. In one case, the HMD may be shared by multiple users. In this case, the record for the captured image may further include a wearer-identification data indicating an identity of the wearer of the HMD when the image was captured. Also in this case, multiple data item-attribute databases may be provided such that each data item-attribute database may be associated with an unique wearer-identification data, and may include data for a set of data items associated with various experiences of the wearer. The data items may include a variety of different files in addition to image files, including video files, audio files, word-processing files, and email files, among other possible files. The data for a given one of the data items may specify one or more context attributes from the set of context attributes associated with the given one of the data items and indicating the experiences of the wearer. In other words, a particular data item-attribute database may be a "life log" for the particular wearer.

As such, the data items included in the data item-attribute database associated with the wearer's experience may include other data items captured by devices on the HMD, in addition to images captured by the HMD according to determined sustained gazes as discussed above. For example, similar to capturing images based on determined sustained gazes of the wearer, other media content may be captured by the HMD based on other sensory inputs that may indicate interest by the wearer including, without limitations, physiological data indicative of galvanic skin responses, electrocardiographic responses, electroencephalographic responses, body temperature values, blood pressure values, and hemoglobin oxygenation responses.

In addition to data items captured by the HMD, the data item-attribute database may also include data items captured or received by other devices associated with the wearer, if the other devices associated with the wearer are in communication with the data storage medium providing the data item-attribute database.

Once the record of captured image has been stored on the data storage medium, a notification may be provided to the wearer indicating that the captured image has been stored in the data item-attribute database or otherwise. In one example, the HMD may include a display, similar to a display 508 of FIG. 5A. In this case, providing the notification may involve providing on the display, a visual indication that the captured image has been stored. In another example, the HMD may include an audio output device, such as an audio speaker. In this case, providing the notification may involve causing an audio signal to be generated, indicating that the captured image has been stored.

3. Example Image Captured Based on Gaze Detection

To further illustrate the capturing and storage of images based on gaze detection, as described above in connection to FIG. 1, the following example scenarios illustrated in FIGS. 2A-2B and FIGS. 3A-3C are provided.

Figure 2A:
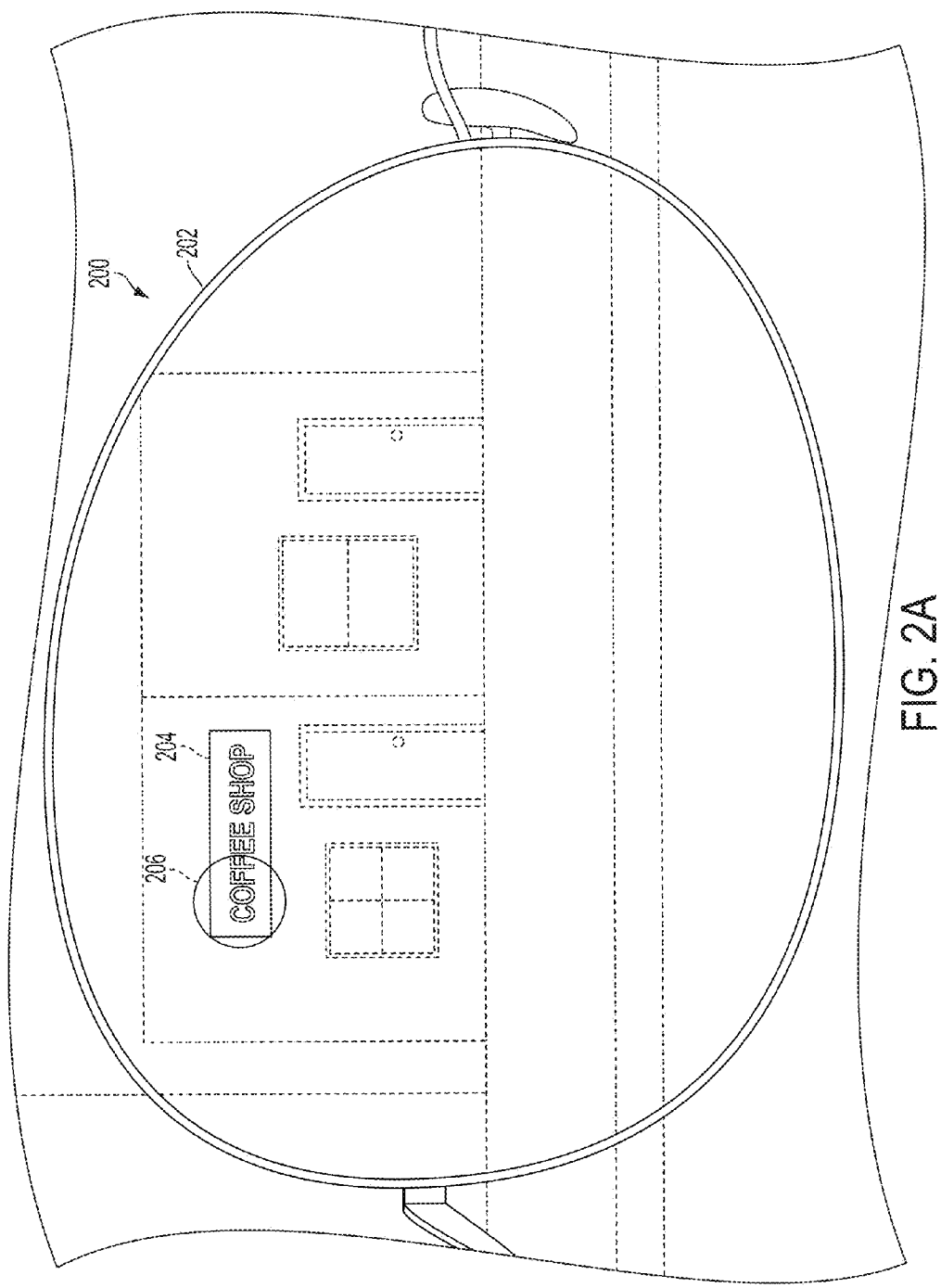
FIG. 2A illustrates a first interaction with a first example wearer-view.

FIG. 2A illustrates a first interaction with a first example wearer-view 200. As shown, the wearer-view 200 may be provided through a lens 202. In one example, the lens 202 may be a transparent display on an HMD such as the lens elements 410 and 412 of FIGS. 4A and 4B, display 508 of FIG. 5A, or lens element 530 of FIG. 5B discussed below.

In the first interaction with the first example wearer-view 200, a wearer of the HMD may be taking a walk in the neighborhood when he/she spots a new coffee shop. As shown, the coffee shop may have a sign 204 indicating a name of the coffee shop. In one example, the wearer may not be in the mood for coffee at the moment but would like to check out the coffee shop in the future. In another example, the wearer may wish to share the new discovery with friends. In either example, the wearer may be looking intently at the sign of the coffee shop.

As the wearer looks intently at the sign of the coffee shop, the HMD may receive eye-movement data indicating that gaze points of the wearer is sustained on an area 206, and may accordingly capture an image including at least a view of the area 206, as previously discussed in connection to method 100 of FIG. 1. Accordingly, the HMD may further be configured to determine at least one indication of context of the captured image. For example, the HMD may receive geographic location data indicating a location of the HMD when the image was captured, or time data indicating when the image was captured.

Figure 2B:
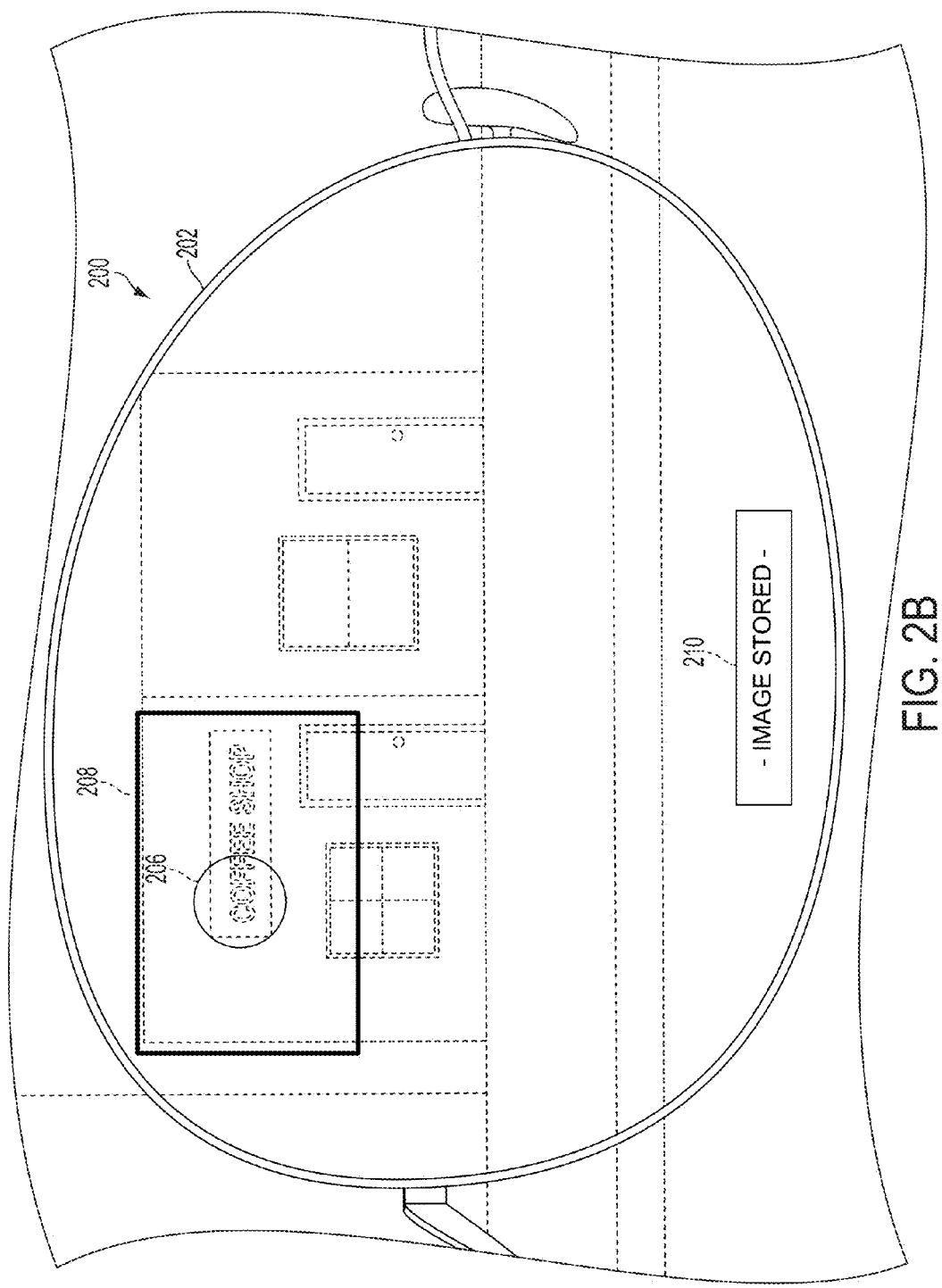
FIG. 2B illustrates a second interaction with the first example wearer-view.

FIG. 2B illustrates a second interaction with the first example wearer-view 200, when a record of the captured image is stored in a data item-attribute database. As shown, a text box 210 may flash on the lens element 202 to provide a visual indication that the captured image has been stored. In addition, an image capture field of view 208 may also flash on the lens element 202 to further indicate the field of view of the captured image. As previously discussed, an audio signal may be generated by the HMD to indicate to the wearer that the record of the captured image has been stored. In a further example, the text box 210 may further convey the at least one indication of context of the captured image. For instance, in addition to, or instead of "IMAGE STORED" as shown in FIG. 2B, text box 210 may further indicate GPS coordinates or nearest cross streets associated with the captured image.

Figure 3A:
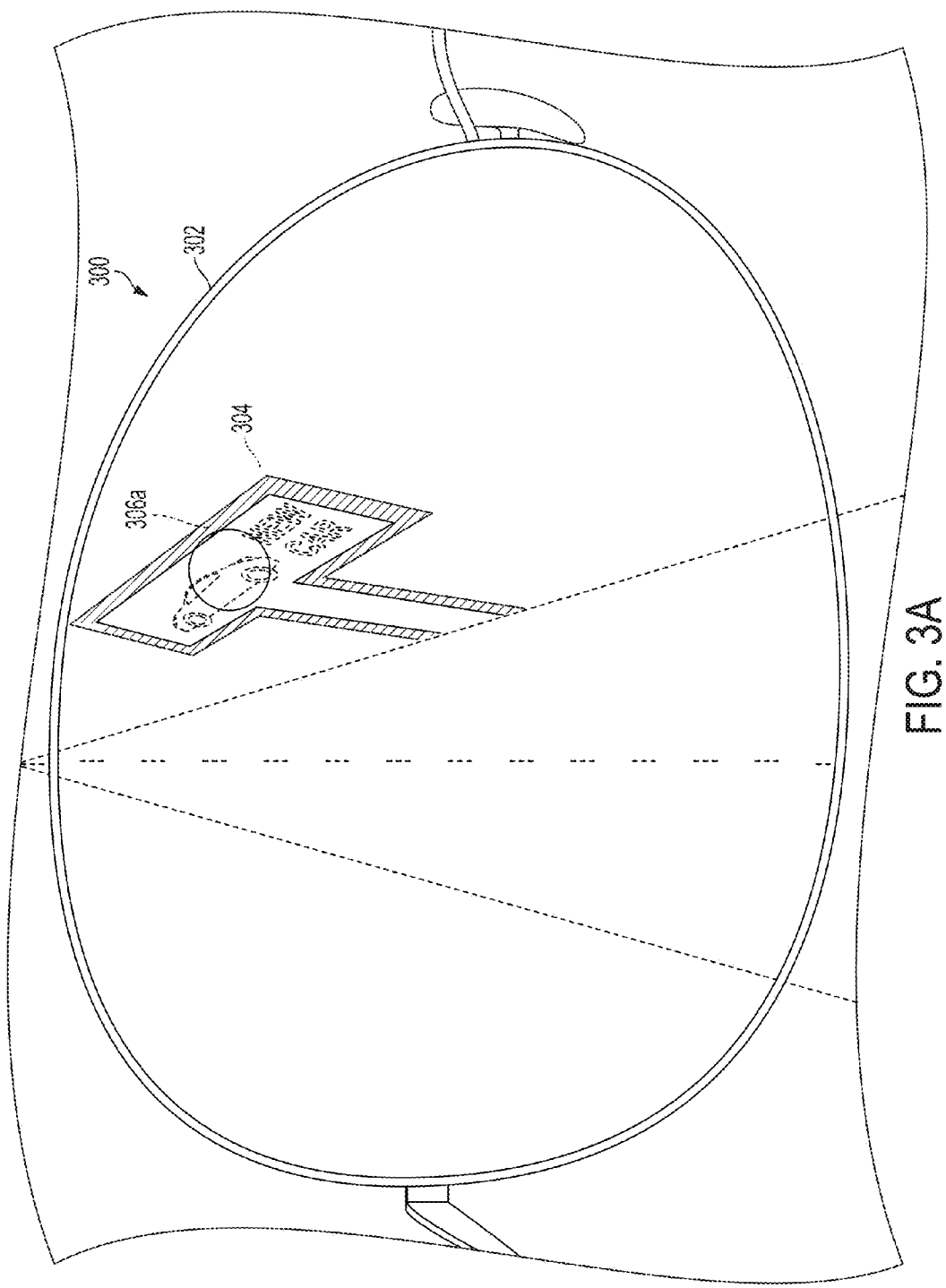
FIG. 3A illustrates a first interaction with a second example wearer-view.

FIG. 3A illustrates a first interaction with a second example wearer-view 300 in which the wearer of an HMD with lens element 302 may be driving on a highway when a billboard 304 comes into view. As shown, the wearer may be intrigued by the information on the billboard 304 such that the HMD may receive eye-movement data indicating that gaze points of the wearer are on an area 306*a*.

Figure 3B:
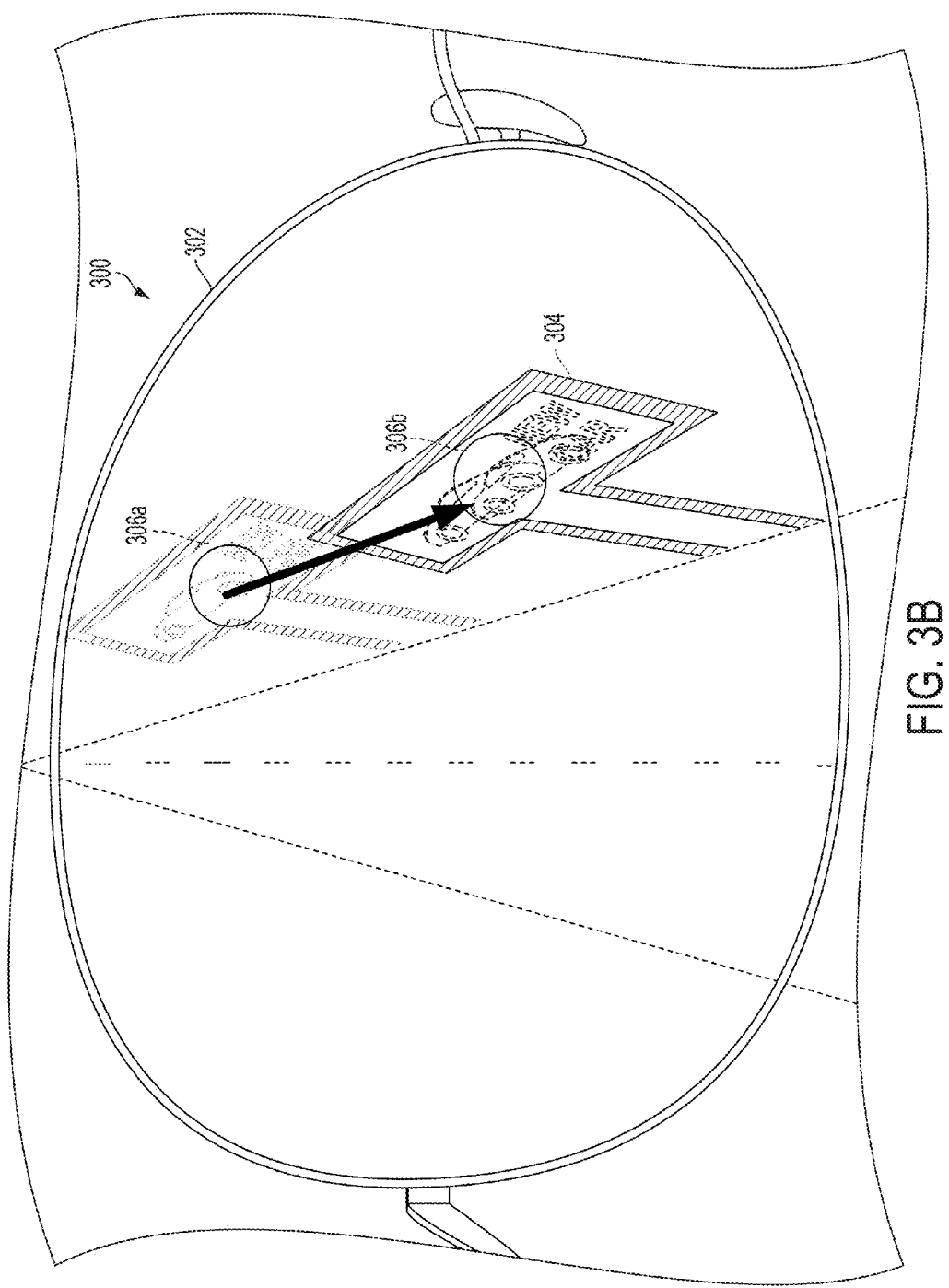
FIG. 3B illustrates a second interaction with the second example wearer-view.

FIG. 3B illustrates a second interaction with the second example wearer-view 300 in which the wearer of the HMD with lens element 302 may be approaching the billboard 304 on the highway, while continuing to look intently at the billboard 304. As shown, the gaze points of the wearer are now on an area 308*b*. In this case, if the HMD is configured to detect movement of the HMD, the HMD may determine that the wearer may in fact be looking intently at an object based on the detected movement of the HMD and the shift of gaze points from the area 306*a* to the area 306*b*. Accordingly, the HMD may capture an image of the object the wearer may be looking intently at, which in this case is the billboard 304.

Figure 3C:
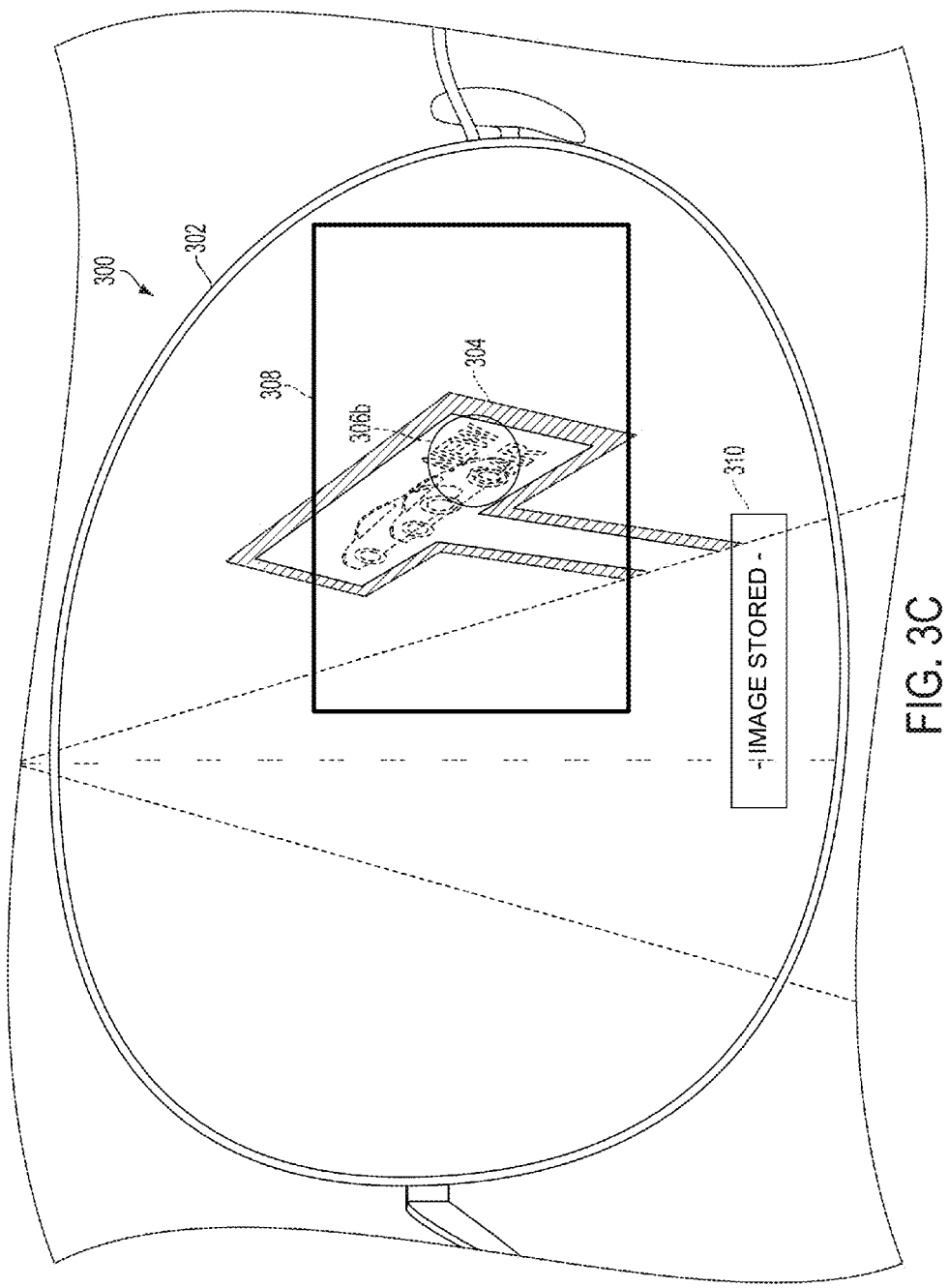
FIG. 3C illustrates a third interaction with the second example wearer-view.

FIG. 3C illustrates a third interaction with the second example wearer-view 300, when a record of the captured image is stored in a data item-attribute database. As shown, a text box 310 may flash on the lens element 302 to provide a visual indication that the captured image has been stored. In addition, an image capture field of view 308 may also flash on the lens element 302 to further indicate the field of view of the captured image.

4. Example System and Device Architecture

Provided herein are example systems that may be configured to execute the methods discussed in connection to FIG. 1, such that an image may be captured and stored.

Figure 4A:
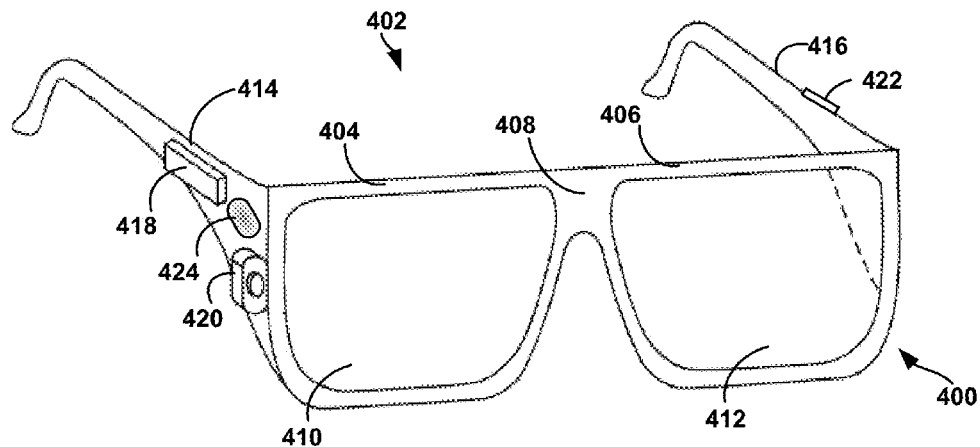
FIG. 4A illustrates an example system for receiving, transmitting, and displaying data.

FIG. 4A illustrates an example system 400 for receiving, transmitting, and displaying data. The system 400 is shown in the form of a wearable computing device. While FIG. 4A illustrates a head-mountable device 402 as an example of a wearable computing device, other types of wearable computing devices could additionally or alternatively be used. As illustrated in FIG. 4A, the head-mountable device 402 has frame elements including lens-frames 404, 406 and a center frame support 408, lens elements 410, 412, and extending side-arms 414, 416. The center frame support 408 and the extending side-arms 414, 416 are configured to secure the head-mountable device 402 to a user's face via a user's nose and ears, respectively.

Each of the frame elements 404, 406, and 408 and the extending side-arms 414, 416 may be formed of a solid structure of plastic and/or metal, or may be formed of a hollow structure of similar material so as to allow wiring and component interconnects to be internally routed through the head-mountable device 402. Other materials may be possible as well.

One or more of each of the lens elements 410, 412 may be formed of any material that can suitably display a projected image or graphic. Each of the lens elements 410, 412 may also be sufficiently transparent to allow a user to see through the lens element. Combining these two features of the lens elements may facilitate an augmented reality or heads-up display where the projected image or graphic is superimposed over a real-world view as perceived by the user through the lens elements 410, 412.

The extending side-arms 414, 416 may each be projections that extend away from the lens-frames 404, 406, respectively, and may be positioned behind a user's ears to secure the head-mountable device 402 to the user. The extending side-arms 414, 416 may further secure the head-mountable device 402 to the user by extending around a rear portion of the user's head. Additionally or alternatively, for example, the system 400 may connect to or be affixed within a head-mountable helmet structure. Other possibilities exist as well.

The system 400 may also include an on-board computing system 418, a video camera 420, a sensor 422, and a finger-operable touch pad 424. The on-board computing system 418 is shown to be positioned on the extending side-arm 414 of the head-mountable device 402; however, the on-board computing system 418 may be provided on other parts of the head-mountable device 402 or may be positioned remote from the head-mountable device 402 (e.g., the on-board computing system 418 could be connected by wires or wirelessly connected to the head-mountable device 402). The on-board computing system 418 may include a processor and memory, for example. The on-board computing system 418 may be configured to receive and analyze data from the video camera 420, the sensor 422, and the finger-operable touch pad 424 (and possibly from other sensory devices, user-interfaces, or both) and generate images for output by the lens elements 410 and 412. The on-board computing system 418 may additionally include a speaker or a microphone for user input (not shown). An example computing system is further described below in connection with FIG. 7.

The video camera 420 is shown positioned on the extending side-arm 414 of the head-mountable device 402; however, the video camera 420 may be provided on other parts of the head-mountable device 402. The video camera 420 may be configured to capture images at various resolutions or at different frame rates. Video cameras with a small form-factor, such as those used in cell phones or webcams, for example, may be incorporated into an example embodiment of the system 400.

Further, although FIG. 4A illustrates one video camera 420, more video cameras may be used, and each may be configured to capture the same view, or to capture different views. For example, the video camera 420 may be forward facing to capture at least a portion of the real-world view perceived by the user. This forward facing image captured by the video camera 420 may then be used to generate an augmented reality where computer generated images appear to interact with the real-world view perceived by the user.

The sensor 422 is shown on the extending side-arm 416 of the head-mountable device 402; however, the sensor 422 may be positioned on other parts of the head-mountable device 402. The sensor 422 may include one or more of a gyroscope or an accelerometer, for example. Other sensing devices may be included within, or in addition to, the sensor 422 or other sensing functions may be performed by the sensor 422.

The finger-operable touch pad 424 is shown on the extending side-arm 414 of the head-mountable device 402. However, the finger-operable touch pad 424 may be positioned on other parts of the head-mountable device 402. Also, more than one finger-operable touch pad may be present on the head-mountable device 402. The finger-operable touch pad 424 may be used by a user to input commands. The finger-operable touch pad 424 may sense at least one of a position and a movement of a finger via capacitive sensing, resistance sensing, or a surface acoustic wave process, among other possibilities. The finger-operable touch pad 424 may be capable of sensing finger movement in a direction parallel or planar to the pad surface, in a direction normal to the pad surface, or both, and may also be capable of sensing a level of pressure applied to the pad surface. The finger-operable touch pad 424 may be formed of one or more translucent or transparent insulating layers and one or more translucent or transparent conducting layers. Edges of the finger-operable touch pad 424 may be formed to have a raised, indented, or roughened surface, so as to provide tactile feedback to a user when the user's finger reaches the edge, or other area, of the finger-operable touch pad 424. If more than one finger-operable touch pad is present, each finger-operable touch pad may be operated independently, and may provide a different function.

Figure 4B:
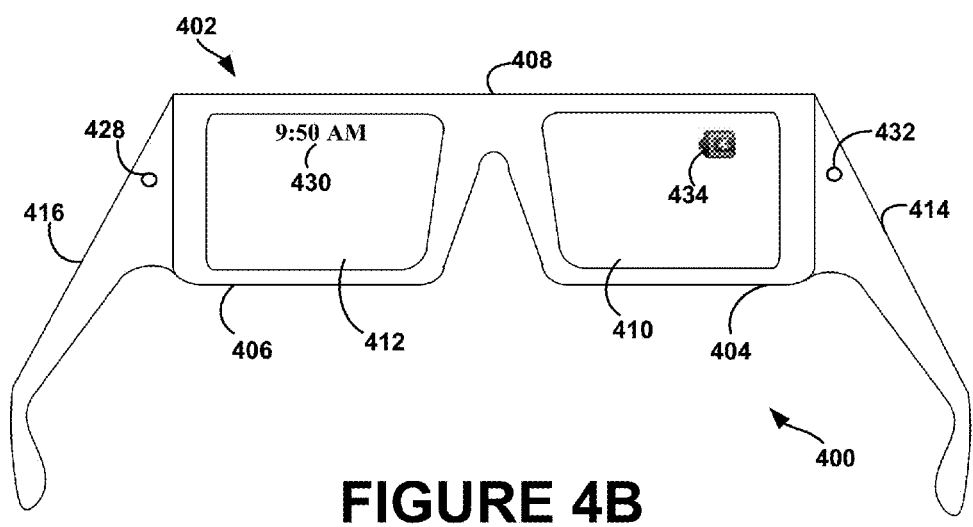
FIG. 4B illustrates an alternate view of the system illustrated in FIG. 5A.

FIG. 4B illustrates an alternate view of the system 400 illustrated in FIG. 4A. As shown in FIG. 4B, the lens elements 410, 412 may act as display elements. The head-mountable device 402 may include a first projector 428 coupled to an inside surface of the extending side-arm 416 and configured to project a display 430 onto an inside surface of the lens element 412. Additionally or alternatively, a second projector 432 may be coupled to an inside surface of the extending side-arm 414 and configured to project a display 434 onto an inside surface of the lens element 410.

The lens elements 410, 412 may act as a combiner in a light projection system and may include a coating that reflects the light projected onto them from the projectors 428, 432. In some embodiments, a reflective coating may be omitted (e.g., when the projectors 428, 432 are scanning laser devices).

In alternative embodiments, other types of display elements may also be used. For example, the lens elements 410, 412 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 404, 406 for driving such a matrix display. Alternatively or additionally, a laser or light emitting diode (LED) source and scanning system could be used to draw a raster display directly onto the retina of one or more of the user's eyes. Other possibilities exist as well.

Figure 5A:
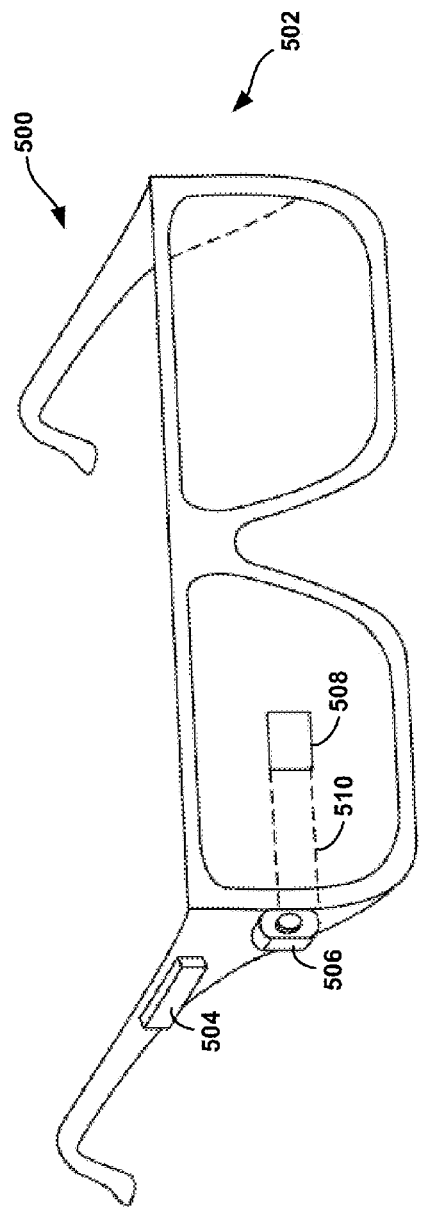
FIG. 5A illustrates another example system for receiving, transmitting, and displaying data.

FIG. 5A illustrates an example system 500 for receiving, transmitting, and displaying data. The system 500 is shown in the form of a wearable computing device 502, which may be implemented as the HMD discussed above, for data item searching. The wearable computing device 502 may include frame elements and side-arms such as those described with respect to FIGS. 4A and 4B. The wearable computing device 502 may additionally include an on-board computing system 504 and a video camera 506, such as those described with respect to FIGS. 4A and 4B. The video camera 506 is shown mountable on a frame of the wearable computing device 502; however, the video camera 506 may be mountable at other positions as well.

As shown in FIG. 5A, the wearable computing device 502 may include a single display 508 which may be coupled to the device. The display 508 may be formed on one of the lens elements of the wearable computing device 502, such as a lens element described with respect to FIGS. 4A and 4B, and may be configured to overlay computer-generated graphics in the user's view of the physical world. The display 508 is shown to be provided in a center of a lens of the wearable computing device 502, however, the display 508 may be provided in other positions. The display 508 is controllable via the computing system 504 that is coupled to the display 508 via an optical waveguide 510.

Figure 5B:
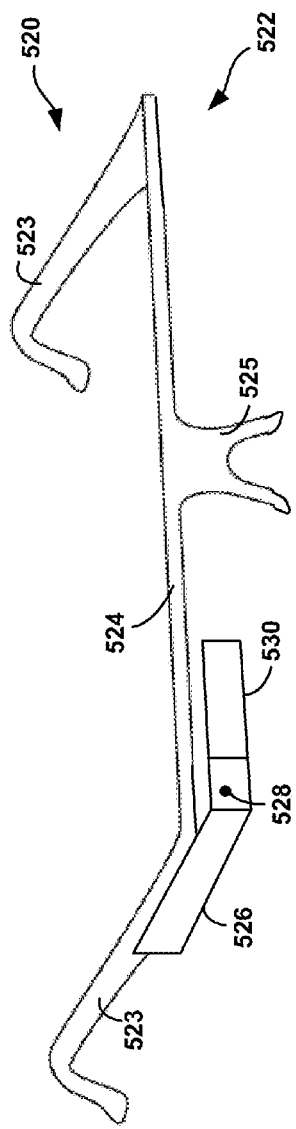
FIG. 5B illustrates yet another example system for receiving, transmitting, and displaying data.

FIG. 5B illustrates an example system 520 for receiving, transmitting, and displaying data. The system 520 is shown in the form of a wearable computing device 522. The wearable computing device 522 may include side-arms 523, a center frame support 524, and a bridge portion with nosepiece 525. In the example shown in FIG. 5B, the center frame support 524 connects the side-arms 523. The wearable computing device 522 does not include lens-frames containing lens elements. The wearable computing device 522 may additionally include an on-board computing system 526 and a video camera 528, such as those described with respect to FIGS. 4A and 4B.

The wearable computing device 522 may include a single lens element 530 that may be coupled to one of the side-arms 523 or the center frame support 524. The lens element 530 may include a display such as the display described with reference to FIGS. 4A and 4B, and may be configured to overlay computer-generated graphics upon the user's view of the physical world. In one example, the single lens element 530 may be coupled to a side of the extending side-arm 523. The single lens element 530 may be positioned in front of or proximate to a user's eye when the wearable computing device 522 is worn by a user. For example, the single lens element 530 may be positioned below the center frame support 524, as shown in FIG. 5B.

FIG. 6 shows a simplified block diagram of an example computer network infrastructure. In system 600, a device 610 communicates using a communication link 620 (e.g., a wired or wireless connection) to a remote device 630. The device 610 may be any type of device that can receive data and display information corresponding to or associated with the data. For example, the device 610 may be a heads-up display system, such as the head-mountable device 402, 500, or 520 described with reference to FIGS. 4A-5B.

Thus, the device 610 may include a display system 612 including a processor 614 and a display 616. The display 616 may be, for example, an optical see-through display, an optical see-around display, or a video see-through display. The processor 614 may receive data from the remote device 630, and configure the data for display on the display 616. The processor 614 may be any type of processor, such as a microprocessor or a digital signal processor, for example.

The device 610 may further include on-board data storage, such as memory 618 coupled to the processor 614. The memory 618 may store software that can be accessed and executed by the processor 614, for example.

The remote device 630 may be any type of computing device or transmitter including a laptop computer, a mobile telephone, or tablet computing device, etc., that is configured to transmit data to the device 610. The remote device 630 and the device 610 may contain hardware to enable the communication link 620, such as processors, transmitters, receivers, antennas, etc.

In FIG. 6, the communication link 620 is illustrated as a wireless connection; however, wired connections may also be used. For example, the communication link 620 may be a wired serial bus such as a universal serial bus or a parallel bus, among other connections. The communication link 620 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Either of such a wired and/or wireless connection may be a proprietary connection as well. The remote device 630 may be accessible via the Internet and may include a computing cluster associated with a particular web service (e.g., social-networking, photo sharing, address book, etc.).

Figure 7:
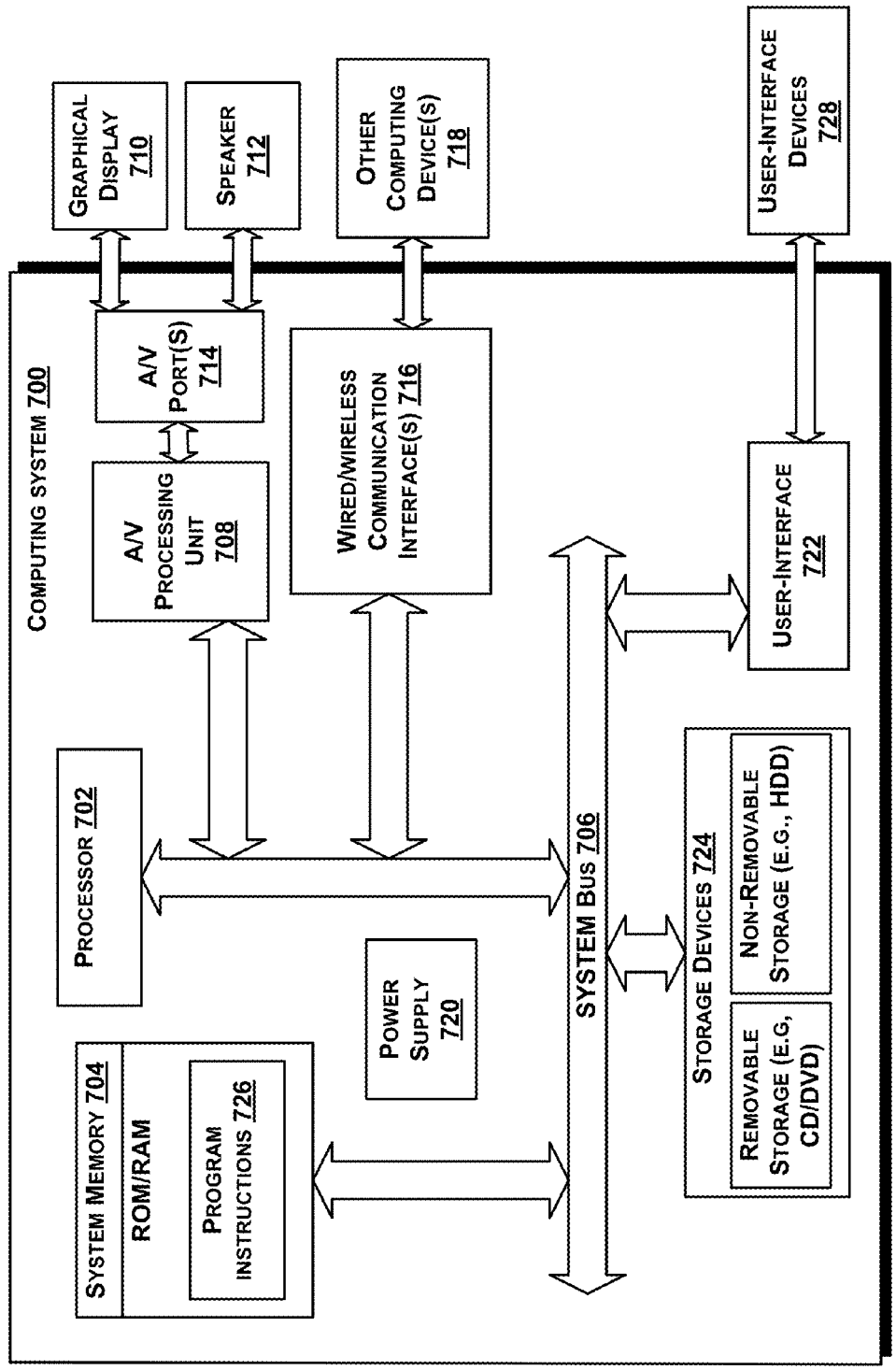
FIG. 7 shows a simplified block diagram depicting example components of an example computing system.

As described above in connection with FIGS. 4A-5B, an example wearable computing device may include, or may otherwise be communicatively coupled to, a computing system, such as computing system 418 or computing system 504. FIG. 7 shows a simplified block diagram depicting example components of an example computing system 600. One or both of the device 610 and the remote device 630 may take the form of computing system 700.

Computing system 700 may include at least one processor 702 and system memory 704. In an example embodiment, computing system 700 may include a system bus 706 that communicatively connects processor 702 and system memory 704, as well as other components of computing system 700. Depending on the desired configuration, processor 702 can be any type of processor including, but not limited to, a microprocessor (μP), a microcontroller (μC), a digital signal processor (DSP), or any combination thereof. Furthermore, system memory 704 can be of any type of memory now known or later developed including but not limited to volatile memory (such as RAM), non-volatile memory (such as ROM, flash memory, etc.) or any combination thereof.

An example computing system 700 may include various other components as well. For example, computing system 700 includes an A/V processing unit 708 for controlling graphical display 710 and speaker 712 (via A/V port 714), one or more communication interfaces 716 for connecting to other computing devices 718, and a power supply 720. Graphical display 710 may be arranged to provide a visual depiction of various input regions provided by user-interface module 722. For example, user-interface module 722 may be configured to provide an user-interface, and graphical display 710 may be configured to provide a visual depiction of the user-interface. User-interface module 722 may be further configured to receive data from and transmit data to (or be otherwise compatible with) one or more user-interface devices 728.

Furthermore, computing system 700 may also include one or more data storage devices 724, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 700.

According to an example embodiment, computing system 700 may include program instructions 726 that are stored in system memory 704 (and/or possibly in another data-storage medium) and executable by processor 702 to facilitate the various functions described herein including, but not limited to, those functions described with respect to FIG. 1. Although various components of computing system 700 are shown as distributed components, it should be understood that any of such components may be physically integrated and/or distributed according to the desired configuration of the computing system.

5. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended to be understood that the following clauses further describe aspects of the present description.

The invention claimed is:

1. A method comprising:
   receiving movement data associated with a head-mountable device (HMD), and determining movements of the HMD based on the movement data;
   receiving eye-movement data associated with the HMD, wherein the HMD comprises an image-capture device, and wherein the image-capture device is arranged to capture image data that corresponds to a wearer-view that is associated with the HMD;
   determining that the eye-movement data corresponds to sustained gaze and responsively:
      determining a location of the sustained gaze in the wearer-view;
      causing the image-capture device to capture an image that includes a view of the location of the sustained gaze;
      determining at least one indication of a context of the captured image; and
      causing a record for the captured image to be stored in a data item-attribute database, wherein the record includes the at least one indication of the context of the captured image, and wherein determining that the eye-movement data corresponds to sustained gaze comprises determining that the eye-movement data indicates a series of gaze points shifting in substantially an opposite direction as the movements of the HMD.

2. The method of claim 1, further comprising providing a notification indicating that the record for the captured image has been stored.

3. The method of claim 2, wherein providing a notification comprises providing on a display, a visual indication that the captured image has been stored.

4. The method of claim 2, wherein providing a notification comprises causing an audio signal to be generated, the audio signal indicating that the captured image has been stored.

5. The method of claim 1, wherein causing the image-capture device to capture an image that includes a view of the location of the sustained gaze comprises causing the image-capture device to focus on the location of the sustained gaze.

6. The method of claim 1, wherein determining at least one indication of a context of the captured image comprises acquiring a geographic location associated with the captured image.

7. The method of claim 1, wherein determining at least one indication of a context of the captured image comprises acquiring a time associated with the captured image.

8. The method of claim 1, wherein causing a record for the captured image to be stored in a data item-attribute database comprises sending the record for the captured image to a server.

9. The method of claim 1, wherein the record for the captured image further includes a wearer-identification data indicating an identity of a user wearing the HMD when the image was captured.

10. The method of claim 9, wherein the data item-attribute database for storing the record of the captured image is associated with the wearer-identification data.

11. A head-mountable device (HMD) comprising:
   a motion detection system configured to acquire movement data associated with the HMD;

an image-capture device arranged to capture image data that corresponds to a wearer-view associated with the HMD;

an eye-tracking system configured to acquire eye-movement data; and a controller configured to:
- receive the movement data
- determine movements of the HMD based on the movement data
- receive the eye-movement data;
- determine that the eye-movement data corresponds to sustained gaze based on the eye-movement data indicating a series of gaze points shifting in substantially an opposite direction as the movements of the HMD and responsively:
  - determine a location of the sustained gaze in the wearer-view;
  - cause the image-capture device to capture an image that includes a view of the location of the sustained gaze;
  - determine at least one indication of a context of the captured image; and
  - cause a record for the captured image to be stored in a data item-attribute database, wherein the record includes the at least one indication of the context of the captured image.

12. The HMD of claim 11, further comprising a data storage medium configured to store at least the data-item attribute database, wherein the controller is configured to cause the record for the captured image to be stored on the data storage medium.

13. The HMD of claim 12, further comprising a global positioning system configured to determine a geographic location associated with the HMD, wherein the controller is configured to determine at least one indication of a context of the captured image by receiving the geographic location when the image is captured and associating the geographic location with the captured image.

14. A non-transitory computer-readable medium having stored thereon instructions executable by a computing device to cause the computing device to perform functions comprising:

receiving eye-movement data associated with a head-mountable device (HMD), wherein the HMD comprises an image-capture device, and wherein the image-capture device is arranged to capture image data that corresponds to a wearer-view that is associated with the HMD;

receiving movement data associated with the HMD;

determining movements of the HMD based on the movement data;

determining that the eye-movement data corresponds to sustained gaze based on the eye-movement data indicating a series of gaze points shifting in substantially an opposite direction as the movements of the HMD and responsively:
- determining a location of the sustained gaze in the wearer-view;
- causing the image-capture device to capture an image that includes a view of the location of the sustained gaze;
- determining at least one indication of a context of the captured image; and causing a record for the captured image to be stored in a data item-attribute database, wherein the record includes the at least one indication of the context of the captured image.

\* \* \* \* \*